(12) United States Patent
Digmann et al.

(10) Patent No.: US 8,141,305 B2
(45) Date of Patent: Mar. 27, 2012

(54) SIDE SEAL MEMBERS FOR A DOCK SEAL

(75) Inventors: Charles J. Digmann, Dubuque, IA (US); Timothy J. Schmidt, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 320 days.

(21) Appl. No.: 12/128,443

(22) Filed: May 28, 2008

(65) Prior Publication Data

US 2009/0293382 A1    Dec. 3, 2009

(51) Int. Cl.
*E04H 14/00* (2006.01)

(52) U.S. Cl. .......... 52/173.2; 52/DIG. 13; 277/650; 49/475.1; 293/109

(58) Field of Classification Search ........... 52/173.2, 52/2.12, DIG. 13; 428/68, 71; 49/460, 475.1; 293/120, 109, 142; 267/139, 140
See application file for complete search history.

(56) References Cited

U.S. PATENT DOCUMENTS

| | | | | |
|---|---|---|---|---|
| 3,181,205 A | * | 5/1965 | Frommelt et al. | 52/173.2 |
| 3,230,675 A | * | 1/1966 | Frommelt et al. | 52/173.2 |
| 3,286,417 A | * | 11/1966 | Dazzo | 52/173.2 |
| 3,322,132 A | | 5/1967 | Rieder et al. | |
| 3,690,710 A | * | 9/1972 | Curran et al. | 293/110 |
| 3,939,614 A | * | 2/1976 | Frommelt et al. | 52/2.13 |
| 4,015,380 A | * | 4/1977 | Chalfant | 52/173.2 |
| 4,161,567 A | * | 7/1979 | Sturgeon | 428/594 |
| 4,724,648 A | * | 2/1988 | Diepholder | 52/173.2 |
| 4,873,800 A | * | 10/1989 | Frommelt et al. | 52/173.2 |
| 5,122,398 A | * | 6/1992 | Seiler et al. | 428/31 |
| 5,125,196 A | * | 6/1992 | Moody | 52/173.2 |
| 5,333,424 A | * | 8/1994 | Chalfant et al. | 52/173.2 |
| 5,658,633 A | * | 8/1997 | Di Biase | 428/68 |
| 6,014,844 A | * | 1/2000 | Thill | 52/173.2 |

(Continued)

FOREIGN PATENT DOCUMENTS

| | | |
|---|---|---|
| WO | 0027734 | 5/2000 |
| WO | 0078653 | 12/2000 |
| WO | 2004074140 | 9/2004 |

OTHER PUBLICATIONS

Patent Cooperation Treaty, "International Search Report," issued by the International Searching Authority in connection with PCT application No. PCT/US2009/042572, mailed Jul. 16, 2009 (5 pages).

(Continued)

*Primary Examiner* — Robert Canfield
*Assistant Examiner* — Matthew Gitlin
(74) *Attorney, Agent, or Firm* — Hanley, Flight & Zimmerman, LLC

(57) ABSTRACT

Side seal member for a loading dock seal are disclosed. An example truck loading dock seal comprising a resiliently compressible side pad supported by a relatively rigid backer and encased within a pliable cover includes at least one flexible lip protruding from the cover to seal a gap that might exist between the backer and the wall to which the backer is mounted. In some cases, the lip is part of the cover and is located where a rear vertical edge of the side pad meets the wall. The flexibility of the lip enables the lip to sealingly conform to a wall having an irregular surface. For additional sealing, a back sheet of the pliable cover includes a touch-and-hold fastener and/or overlapping layers of material that can provide a compressible seal between the wall and the backer.

26 Claims, 6 Drawing Sheets

U.S. PATENT DOCUMENTS

| | | | |
|---|---|---|---|
| 6,110,312 A * | 8/2000 | Arnold et al. | 156/204 |
| 6,120,871 A * | 9/2000 | De Biase | 428/68 |
| 6,272,799 B1 * | 8/2001 | Ashelin et al. | 52/173.2 |
| 6,854,224 B2 * | 2/2005 | Thill et al. | 52/173.2 |
| 7,246,467 B1 * | 7/2007 | Miller et al. | 52/2.12 |
| 7,287,353 B2 * | 10/2007 | Thill et al. | 52/173.2 |
| 7,383,664 B2 | 6/2008 | Chalfant | |
| 2002/0112418 A1 * | 8/2002 | Thill et al. | 52/173.2 |
| 2003/0177720 A1 * | 9/2003 | Hoffmann et al. | 52/173.2 |
| 2004/0123532 A1 * | 7/2004 | Thill et al. | 52/173.2 |
| 2005/0108961 A1 | 5/2005 | Chalfant | |
| 2006/0272222 A1 * | 12/2006 | Hoffmann et al. | 52/2.12 |
| 2007/0151819 A1 * | 7/2007 | Schmidt et al. | 188/377 |
| 2007/0152390 A1 * | 7/2007 | DiBiase | 267/140 |

OTHER PUBLICATIONS

Patent Cooperation Treaty, "Written Opinion," issued by the International Searching Authority in connection with PCT application No. PCT/US2009/042572, mailed Jul. 16, 2009 (6 pages).

International Bureau, "International Preliminary Report on Patentability," issued in connection with international application serial No. PCT/US2009/042572, issued Nov. 30, 2010, 7 pages.

United States Patent and Trademark Office, "Non-Final Office Action," issued in connection with U.S. Appl. No. 13/231,455, mailed Nov. 10, 2011, 8 pages

* cited by examiner

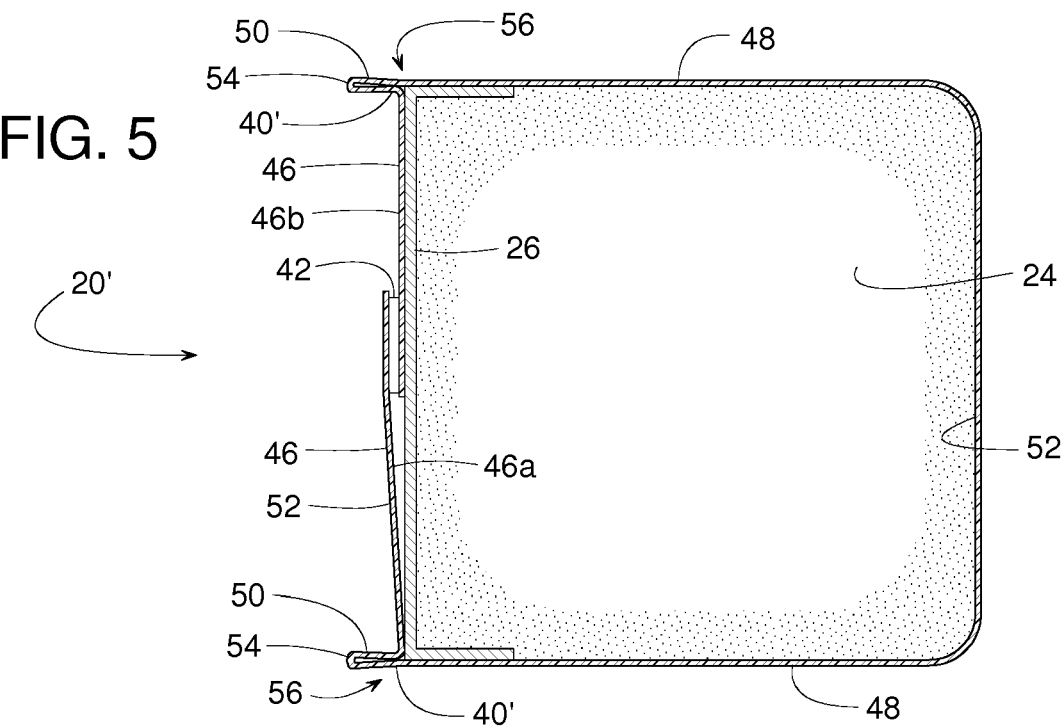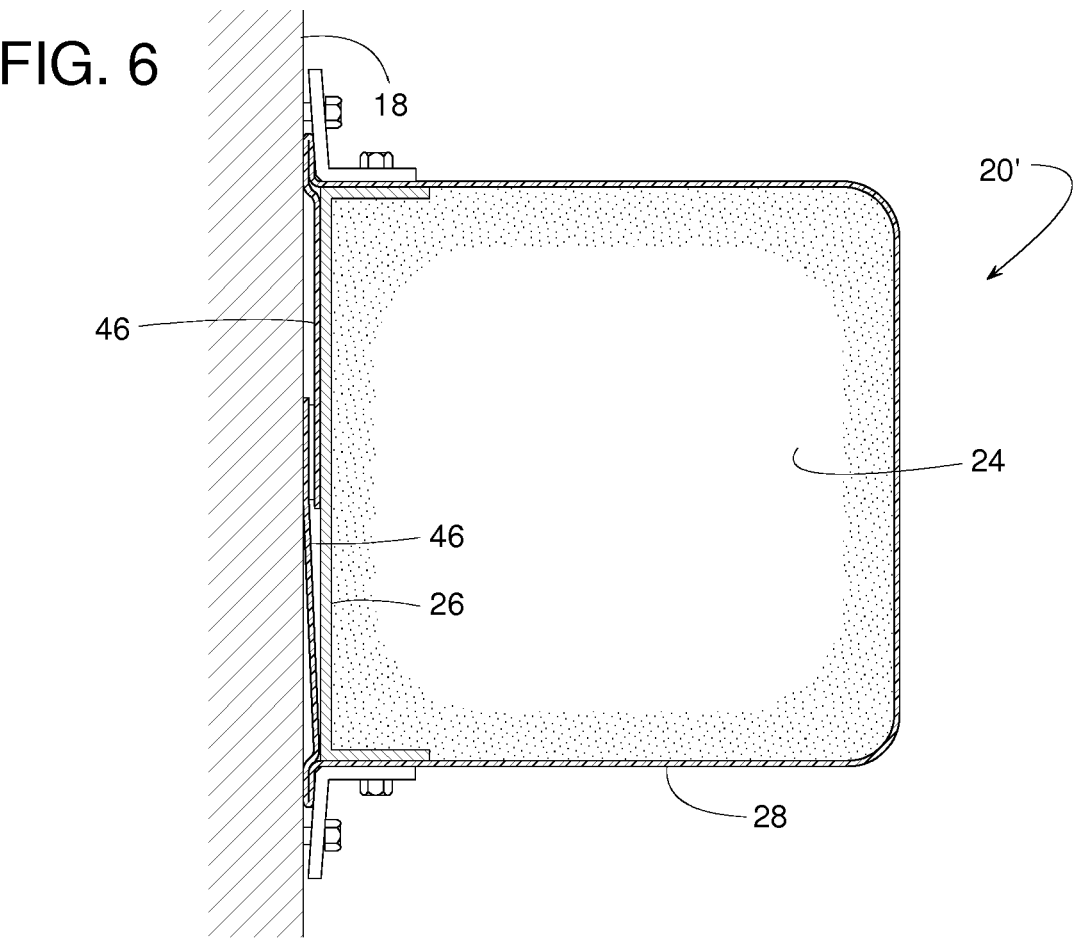

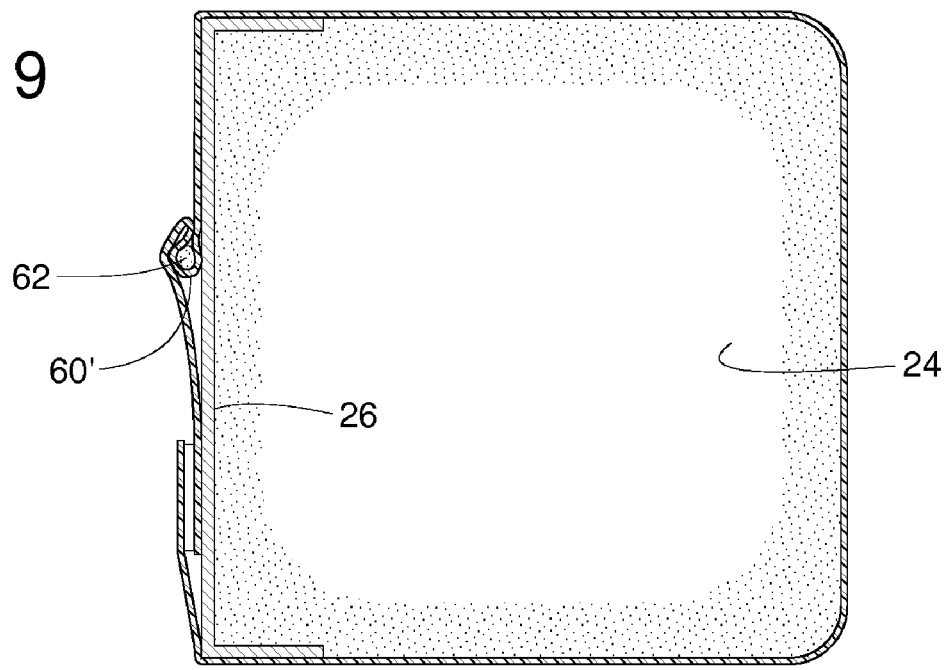
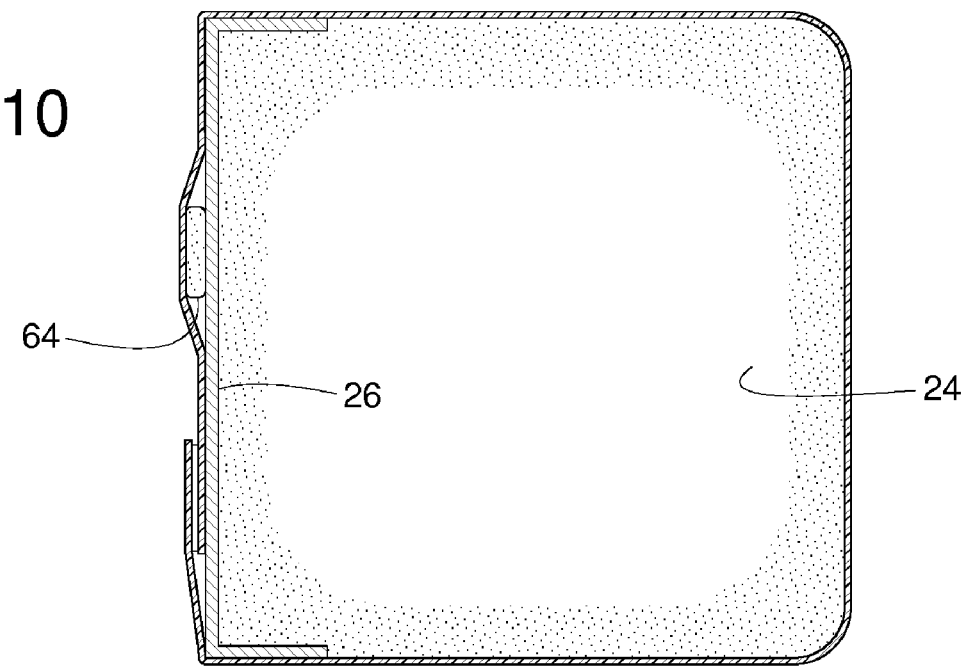

SIDE SEAL MEMBERS FOR A DOCK SEAL

FIELD OF THE DISCLOSURE

The subject disclosure generally pertains to loading dock seals and, more specifically, to side seal members for a dock seal.

BACKGROUND

When an exterior doorway of a building is used as a loading dock for vehicles, such as trucks and tractor/trailers, the perimeter of the doorway often includes a dock seal. Dock seals close off air gaps that would otherwise exist between the exterior face of the building and the back end of the trailer. Sealing the air gaps allows cargo from the rear of the trailer to be loaded or unloaded while dockworkers and the cargo are protected from the weather and other elements.

To seal the rear vertical edges of the vehicle, dock seals typically include two side seals running vertically along the lateral edges of the doorway. A top seal, header, or curtain extending horizontally across the doorway's upper edge is often used for sealing the vehicle's upper rear edge.

Although the actual construction of dock seals may vary, typically, side seals comprise a resiliently compressible foam core supported by a rigid backer, such as a wood plank. The foam core and backer are normally encased within a protective cover made of fabric or some other pliable material. Sealing is provided by backing the trailer up against the seal so that the seal compressively conforms to the rear shape of the trailer. The foam core provides the necessary compliance and resilience to repeatedly conform to the shape of various trailers; the outer cover protects the foam core from dirt, water and wear; and the backer provides solid structure for mounting the seal to the wall and for supporting the foam core so that the foam core does not twist and roll within the cover.

Although the compressible foam core usually seals quite well against the rear edges of the vehicle, the relatively rigid backer might not always seal so tightly against a wall having an irregular surface, such as a brick surface. Thus, air gaps might exist between the wall and the backside of the side seal. Such gaps might be sealed using caulk; however, a substantial amount of caulk might be needed for large gaps. An excessive amount of caulk can create a messy appearance, and the caulk can crack or tear when the side seal deflects under compressive pressure from a vehicle.

BRIEF DESCRIPTION OF THE DRAWINGS

FIG. 5 is a cross-sectional view similar to FIG. 3 but showing another example dock seal described herein.

FIG. 6 is a cross-sectional view similar to FIG. 4 but showing the example side seal of FIG. 5.

FIG. 9 is a cross-sectional view similar to FIG. 7 but showing yet another example side seal described herein.

FIG. 10 is a cross-sectional view similar to FIGS. 3, 5, 7 and 9 but showing yet another example side seal described herein.

DETAILED DESCRIPTION

Figure 1:
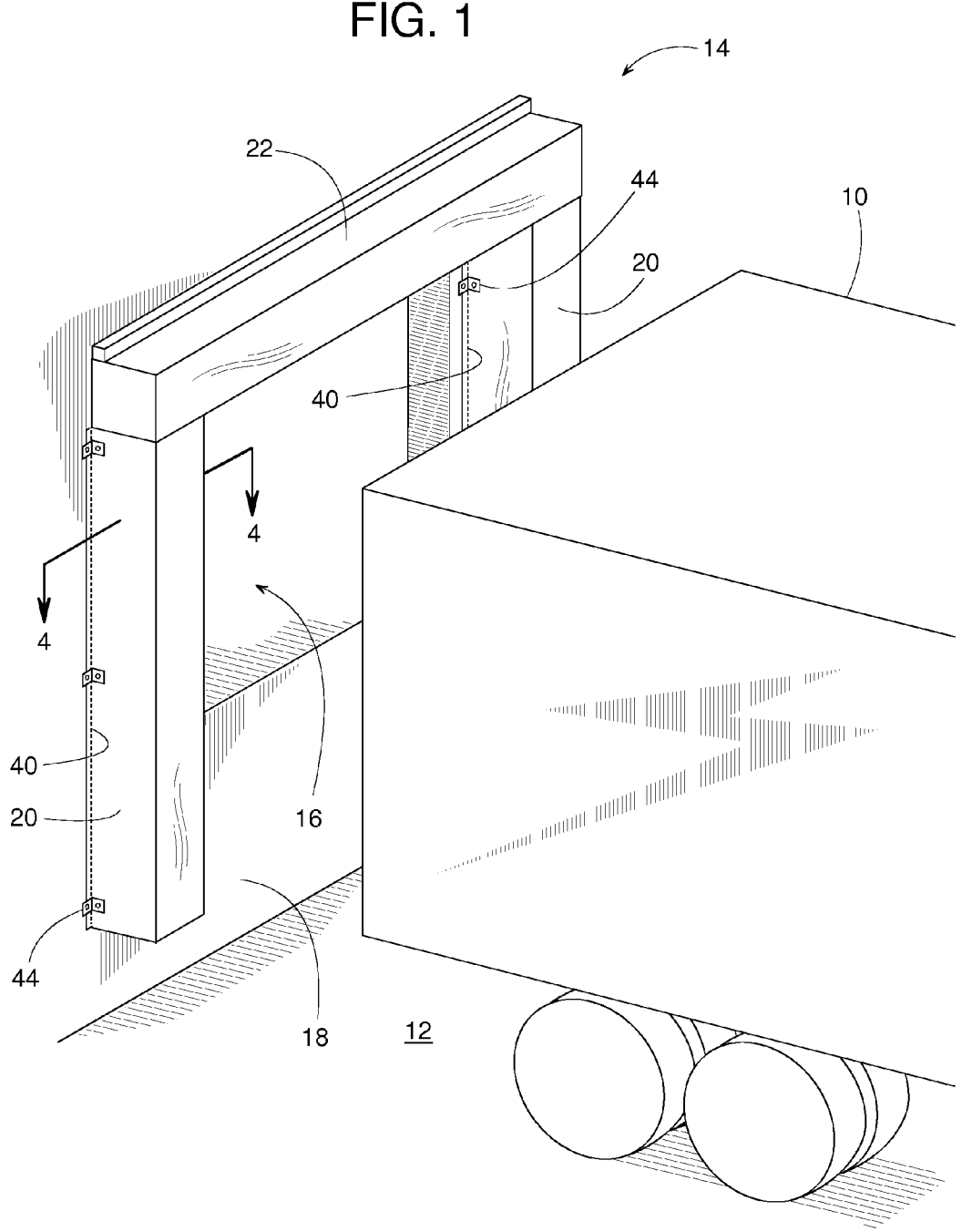
FIG. 1 is a perspective view of an example dock seal that is about to be engaged by a vehicle.
Figure 2:
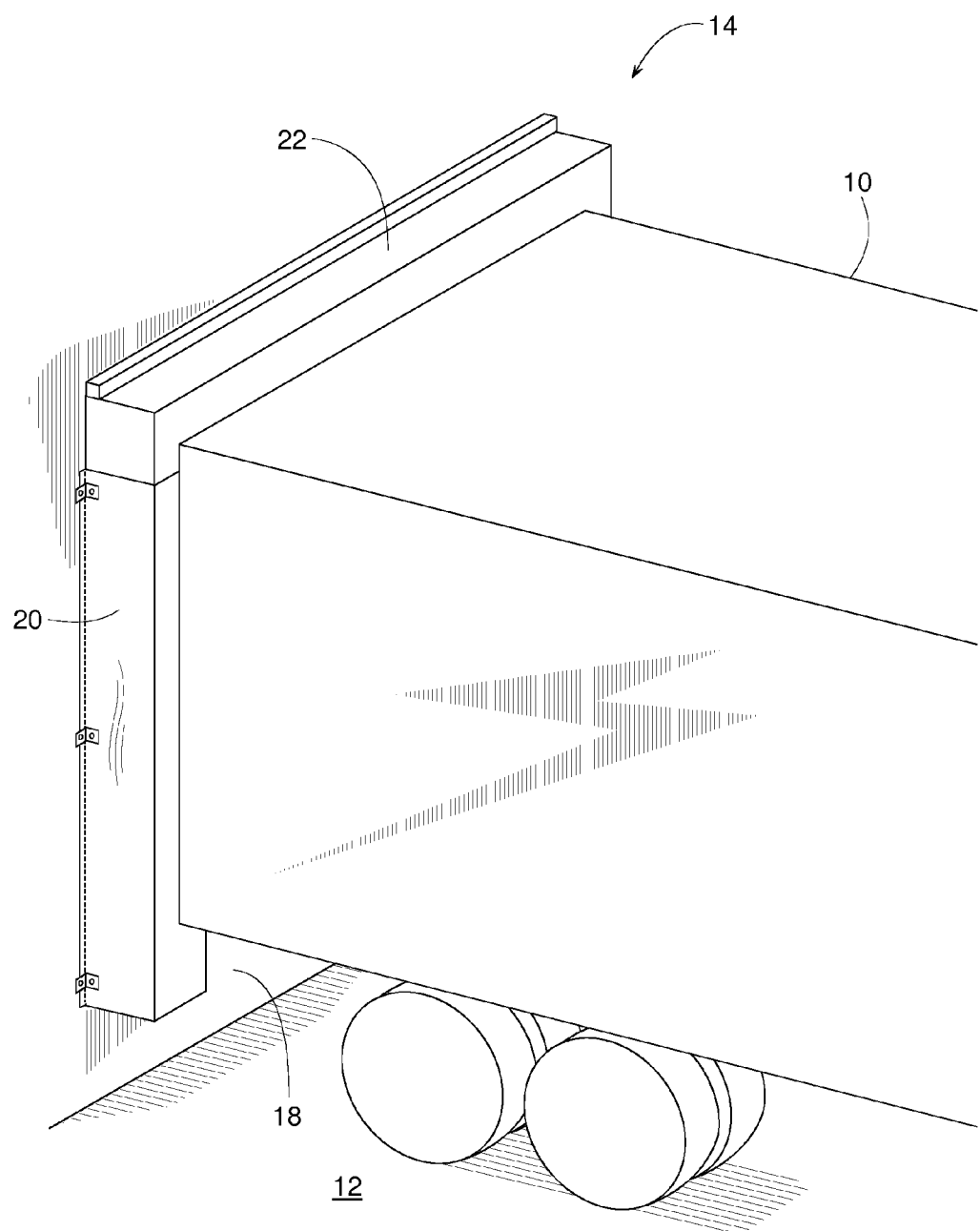
FIG. 2 is a perspective view of the example dock seal of FIG. 1 having a vehicle engaged with the example dock seal of FIG. 1.

FIG. 1 shows a vehicle 10, such as a trailer of a truck, backing into a loading dock 12 that includes a dock seal 14, and FIG. 2 shows vehicle 10 parked at its loading/unloading position and engaged with the dock seal 14. Loading dock 12 is basically a doorway 16 or an opening in a wall 18 of a building for loading and unloading of the vehicle's cargo through a rear access opening of the vehicle.

To provide a barrier to weather as vehicle 10 is being serviced at the doorway, dock seal 14 is mounted to wall 18 around doorway 16. Dock seal 14 helps seal the gaps between wall 18 and the rear edges of vehicle 10. Dock seal 14 includes two resiliently compressible side seals 20 for sealing against the vehicle's lateral rear edges and an upper seal 22 or curtain for sealing along the vehicle's upper rear edge.

Figure 3:
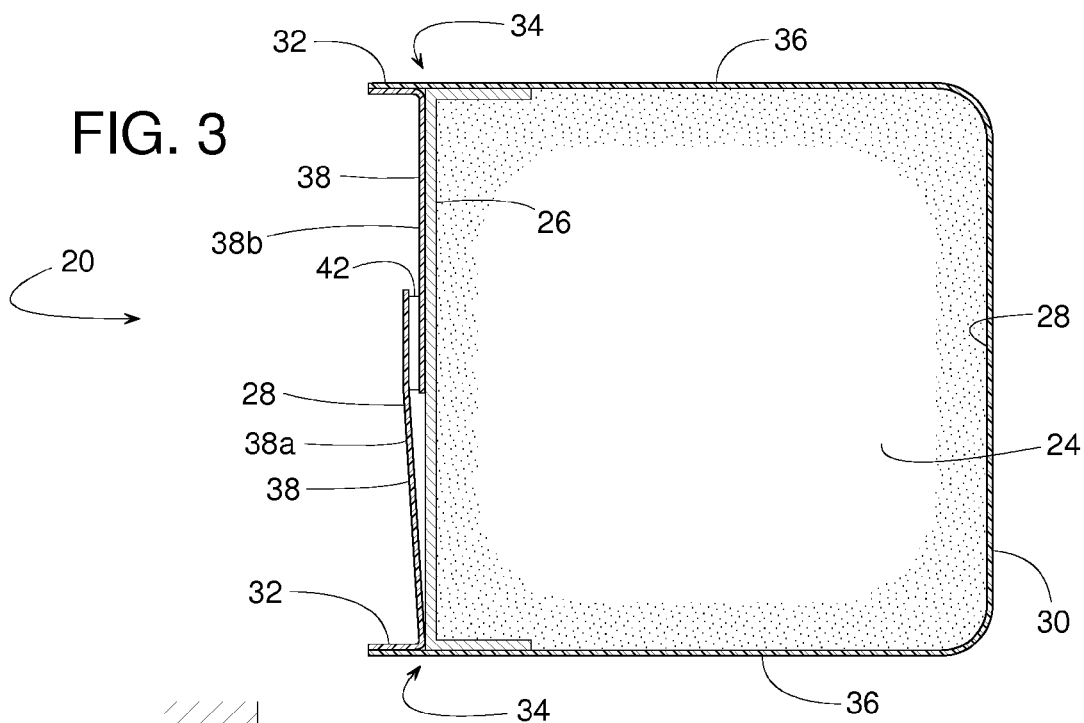
FIG. 3 is a cross-sectional view similar to FIG. 4 but showing the side seal prior to it being mounted to a wall.
Figure 4:
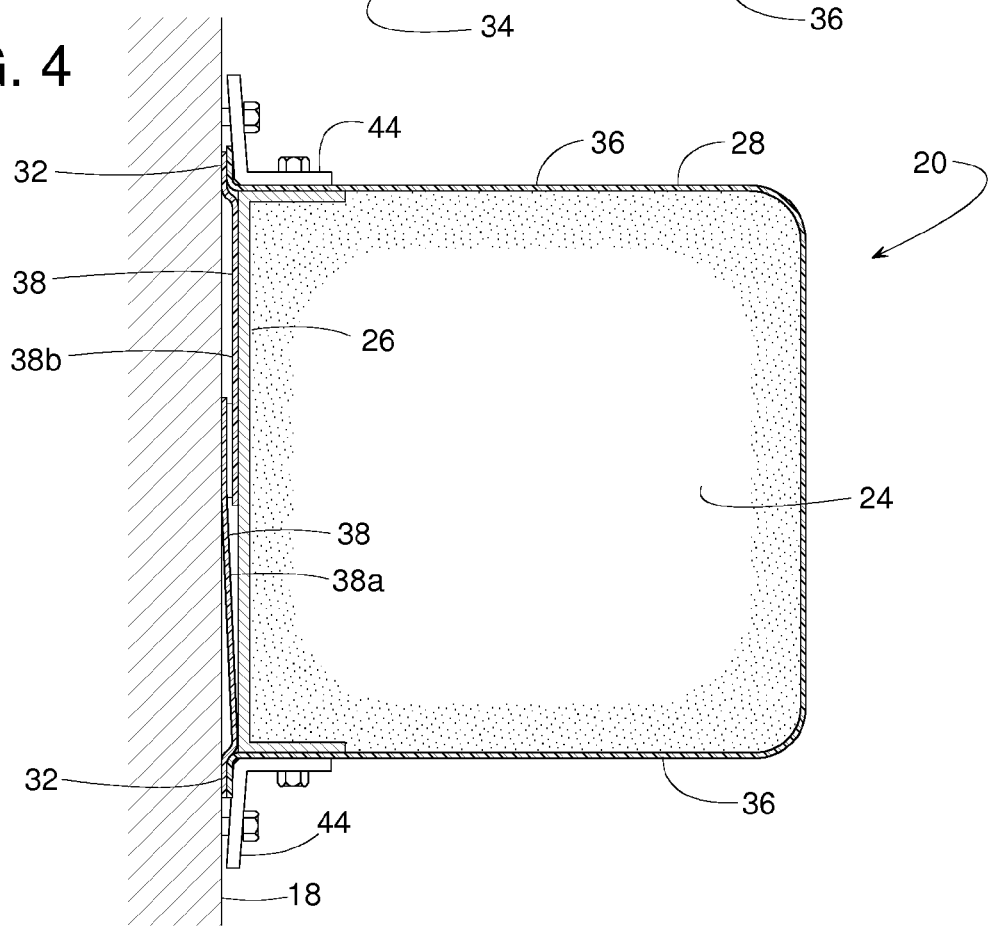
FIG. 4 is a cross-sectional view taken along line 4-4 of FIG. 1.

Referring to FIGS. 3 and 4, the basic construction of side seals 20 can comprise a resiliently compressible member 24 supported by a relatively rigid backer 26 such as, for example a wood plank or a piece of formed sheet metal. Compressible member 24 can be made of foam or a mechanically resilient structure. Compressible member 24 and backer 26 are preferably encased within a protective cover 28 made of fabric or some other pliable material. Sealing against weather is accomplished by vehicle 10 backing up against seal 20 so that seal 20 compressively conforms to the shape of the vehicle's rear edges. In some examples, member 20 comprises resiliently compressible foam that provides the necessary compliance and resilience to repeatedly conform to the shape of various vehicles (e.g., vehicle 10). Outer cover 28 protects compressible member 24 from dirt, water, and other elements. A front sheet 30 of cover 28 helps protect compressible member 24 from wear. Backer 26 provides solid structure for mounting seal 20 to wall 18 and for supporting compressible member 24.

To ensure that side seal 20 is in intimate sealing contact with a possibly irregular surface of wall 18, side seal 20 includes one or more flexible protruding lips 32 at an interface 34 between a side sheet 36 and a back sheet 38 of cover 28. Lip 32 can be produced or formed by sewing side sheet 36 to back sheet 38 along interface 34, thus creating a thread seam 40 (FIG. 1). Other methods of joining sheets 36 and 38 include, but are not limited to, thermal welding, ultrasonic welding, adhesive bonding, etc. Upon mounting side seal 20 to wall 18, lips 32 compliantly deflect to conform to various irregularities in the surface of wall 18, thereby eliminating or at least reducing gaps (e.g., air gaps) that might otherwise exist between wall 18 and the backside of side seal 20.

After side seal 20 is mounted to wall 18, any remaining gaps, if any, might be sealed by applying a layer of caulk between lip 32 and wall 18. In this manner, much of the caulk can be hidden underneath lip 32.

To further seal gaps between side seal 20 and wall 18, back sheet 38 can be comprised of two distinct pieces 38a and 38b that are separably attached to each other via a touch-and-hold fastener 42 (e.g., a fabric hook-and-loop fastener such as VELCRO™). Overlapping pieces 38a and 38b and fastener 42 provide a bulging section that can compressively seal against wall 18 when side seal 20 is mounted to the wall. In some cases, touch-and-hold fastener 42 is omitted, and the bulging section for sealing is provided simply by two or more layers of material overlapping each other. A series of mounting brackets 44 can be used for fastening backer 26 to wall 18.

FIGS. 5 and 6 illustrate another example side seal 20' described herein. Although in FIGS. 3 and 4, side sheet 36 and back sheet 38 are distinct, independent pieces joined by a sewn seam 40, side seal 20' of FIGS. 5 and 6 includes a back sheet 46 that is an integral extension of a side sheet 48. For side seal 20', a flexible protruding lip 50, similar to lip 32, can be produced by folding and sewing a cover 52, as shown. The folding can create a gentle or tight crease 54 at a distal end of lip 50, and a thread seam 40' at a vertical corner 56 of cover 52 produces or forms lip 50. Touch-and-hold fastener 42 can be used for separably joining two ends 46*a* and 46*b* of back sheet 46.

Figure 7:
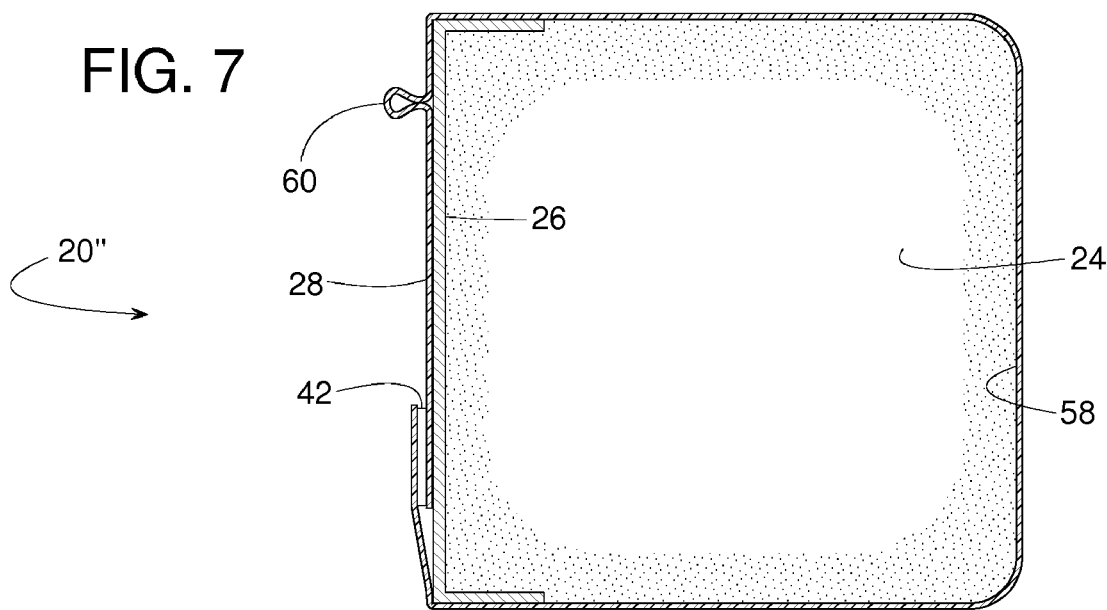
FIG. 7 is a cross-sectional view similar to FIGS. 3 and 5 but showing yet another example side seal described herein.
Figure 8:
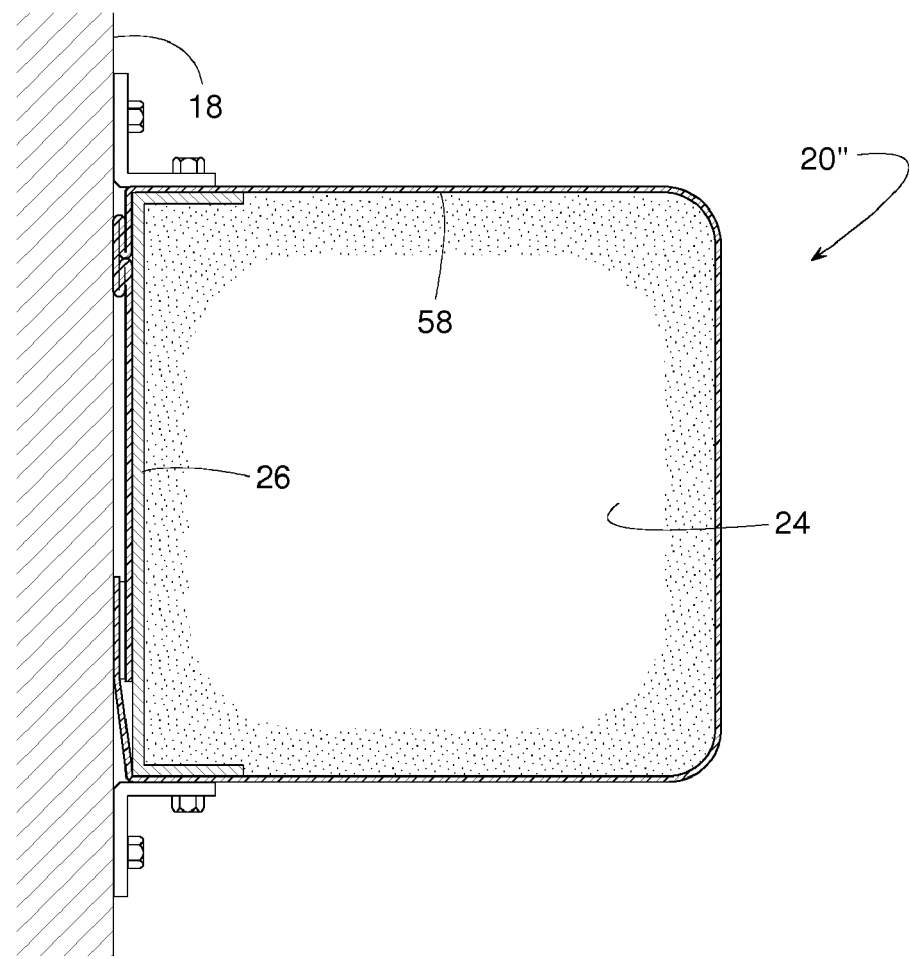
FIG. 8 is a cross-sectional view similar to FIGS. 4 and 6 but showing the side seal of FIG. 7.

FIGS. 7 and 8 illustrate yet another example side seal 20" described herein. As shown in FIGS. 7 and 8, a cover 58 includes one lip 60 that is produced in a manner similar to lips 50 of FIGS. 5 and 6. In this case, however, lip 60 is positioned so as to be compressed between wall 18 and backer 26 upon mounting side seal 20" wall 18. Touch-and-hold fastener 42 provides additional sealing.

Although lip 60 of FIG. 7 is shown as a hollow loop of material on the exterior surface of side seal 20", the loop created by lip 60 could be filled with a compressible foam core, and/or lip 60 could be situated between backer 26 and the exterior surface of cover 58. FIG. 9, for example, shows a loop-shaped lip 60' filled with a compressible foam core 62, whereby core 62 urges lip 60' to conform to an irregular surface of wall 18. For perhaps a neater appearance or ease of manufacturing, lip 60' of FIG. 9 is between backer 26 and the exterior surface of the side seal 20".

In yet another example, shown in FIG. 10, sealing between a side seal and wall 18 is achieved by installing a compressible foam insert 64 between backer 26 and a cover similar to cover 58. In this case, the bulge created by insert 64 being underneath the cover is referred to as a "lip" that can help seal gaps between a backer and a wall to which the backer is mounted. The bulge and resulting lip created by insert 64 can be narrow, as shown, or extend the full width of backer 26.

At least some of the aforementioned examples include one or more features and/or benefits including, but not limited to, the following:

In some examples, a pliable cover for a side seal of a loading dock includes a flexible protruding lip that helps seal a gap between the side seal and a wall to which the side seal is mounted.

In some examples, the protruding lip is sufficiently flexible and pliable to conform to an irregular surface of a wall.

In some examples, the protruding lip serves as a narrow cover under which caulk can be applied, thus much of the caulk is hidden between the lip and the wall.

In some examples, the protruding lip is positioned completely behind the side seal to make it easier to additionally caulk the side seal to the wall if necessary.

In some examples, the protruding lip is made from a combination of a back sheet and a side sheet.

In some examples, an interface between the side sheet and the back sheet is at a vertical corner of the side seal.

In some examples, an interface between the side sheet and the back sheet is located behind the side seal, i.e., between the back sheet and the wall.

In some examples, a side seal includes a touch-and-hold fastener and/or overlapping layers of material that are held in compression to seal a gap between a wall and the backside of the side seal.

In some examples, the back sheet of a side seal is comprised of two distinct pieces.

In some examples, the side sheet and the back sheet are two distinct pieces.

In some examples, the side sheet and the back sheet are an integral extension of each other.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. A dock seal mountable to a wall adjacent a doorway for sealingly engaging a vehicle at a loading dock, the dock seal comprising:
a backer having a back surface that faces the wall when the backer is attached to the wall;
a resiliently compressible member supported by the backer;
a pliable cover overlying the resiliently compressible member, the pliable cover comprises a front sheet adapted to engage the vehicle, a back sheet that lies between the back surface and the wall when the backer is attached to the wall, a first side sheet that extends between the front sheet and the back sheet, and a first flexible protruding lip at an interface between the first side sheet and the back sheet, the first flexible protruding lip is pressed against the wall when the backer is attached to the wall.

2. The dock seal of claim 1, wherein the interface and the first flexible protruding lip is at a vertical corner of the pliable cover.

3. The dock seal of claim 1, further comprising a second flexible protruding lip pressed against the wall when the backer is attached to the wall, wherein the back sheet is interposed between the first flexible protruding lip and the second flexible protruding lip.

4. The dock seal of claim 1, further comprising a thread seam on the first flexible protruding lip.

5. The dock seal of claim 4, wherein the back sheet and the first side sheet are at least two distinct pieces that are attached to each other via the thread seam.

6. The dock seal of claim 4, wherein the first flexible protruding lip includes a crease, and the back sheet is an integral extension of the first side sheet.

7. The dock seal of claim 1, wherein the back sheet is comprised of two distinct pieces that are attached to each other.

8. The dock seal of claim 1, wherein the back sheet includes two ends with a separable joint therebetween, and the separable joint is compressed between the wall and the backer when the backer is attached to the wall.

9. The dock seal of claim 8, wherein the separable joint includes a touch-and-hold fastener.

10. The dock seal of claim 1, wherein the resiliently compressible member is comprised of foam.

11. The dock seal of claim 1, wherein the backer is comprised of sheet metal.

12. A dock seal mountable to a wall adjacent a doorway for sealingly engaging a vehicle at a loading dock, the dock seal comprising:
a backer having a back surface that faces the wall when the backer is attached to the wall;
a resiliently compressible member supported by the backer;
a pliable cover overlying the resiliently compressible member, the pliable cover comprises a front sheet adapted to engage the vehicle, a back sheet that lies between the back surface and the wall when the backer is attached to the wall, a first side sheet that extends between the front sheet and the back sheet, and a first flexible protruding lip that extends from a vertical corner edge between the first side sheet and the back sheet, the first flexible protruding lip is pressed against the wall when the backer is attached to the wall; and a second flexible protruding lip pressed against the wall when the backer is attached to the wall, wherein the back sheet is interposed between the first flexible protruding lip and the second flexible protruding lip.

13. The dock seal of claim 12, further comprising a thread seam on the first flexible protruding lip.

14. The dock seal of claim 13, wherein the back sheet and the first side sheet are at least two distinct pieces that are attached to each other via the thread seam.

15. The dock seal of claim 13, wherein the first flexible protruding lip includes a crease, and the back sheet is an integral extension of the first side sheet.

16. The dock seal of claim 12, wherein the back sheet is comprised of two distinct pieces that are attached to each other.

17. The dock seal of claim 12, wherein the back sheet includes two ends with a separable joint therebetween, and the separable joint is compressed between the wall and the backer when the backer is attached to the wall.

18. The dock seal of claim 17, wherein the separable joint includes a touch-and-hold fastener.

19. A dock seal mountable to a wall adjacent a doorway for sealingly engaging a vehicle at a loading dock, the dock seal comprising:

a backer having a back surface that faces the wall when the backer is attached to the wall;

a resiliently compressible member supported by the backer;

a pliable cover overlying the resiliently compressible member, the pliable cover comprises a front sheet adapted to engage the vehicle, a back sheet that lies between the back surface and the wall when the backer is attached to the wall, a first side sheet that extends between the front sheet and the back sheet, and a first flexible protruding lip that extends from a vertical corner edge between the first side sheet and the back sheet, the first flexible protruding lip is pressed against the wall when the backer is attached to the wall; and a second flexible protruding lip pressed against the wall when the backer is attached to the wall, wherein the back sheet is interposed between the first flexible protruding lip and the second flexible protruding lip;

a thread seam on the first flexible protruding lip; and a touch-and-hold fastener that connects two ends of the back sheet together, wherein the touch-and-hold fastener is compressed between the wall and the backer when the backer is attached to the wall.

20. The dock seal of claim 19, wherein the back sheet is comprised of two distinct pieces that are attached to each other via the touch-and-hold fastener.

21. The dock seal of claim 1, wherein the first flexible protruding lip extends substantially the entire length of the pliable cover.

22. The dock seal of claim 1, wherein the first flexible protruding lip is integral with the pliable cover.

23. The dock seal of claim 12, wherein the first and second flexible protruding lips extend substantially the entire length of the pliable cover.

24. The dock seal of claim 12, wherein the first and second flexible protruding lips are integral with the pliable cover.

25. The dock seal of claim 19, wherein the first flexible protruding lip extends substantially the entire length of the pliable cover.

26. The dock seal of claim 19, wherein the first flexible protruding lip is integral with the pliable cover.

* * * * *